United States Patent
Totino et al.

(10) Patent No.: US 6,800,150 B2
(45) Date of Patent: Oct. 5, 2004

(54) MANUFACTURING PROCESS FOR AN ELEMENT OF A CHEMICAL DEVICE COMPRISING A SUPPORT PART IN METAL AND AN ANTICORROSION METALLIC COATING

(75) Inventors: Ernest Totino, Ruffine (FR); Christian Hug, Montigny les Metz (FR)

(73) Assignee: Le Carbone Lorraine, Courbevoie (FR)

( * ) Notice: Subject to any disclaimer, the term of this patent is extended or adjusted under 35 U.S.C. 154(b) by 112 days.

(21) Appl. No.: 10/175,278

(22) Filed: Jun. 20, 2002

(65) Prior Publication Data

US 2003/0201037 A1 Oct. 30, 2003

(30) Foreign Application Priority Data

Apr. 29, 2002 (WO) ................................ PCT/FR02/01490

(51) Int. Cl.⁷ ............................................... B23K 31/02
(52) U.S. Cl. ..................... 148/528; 228/155; 228/183; 228/184; 228/208
(58) Field of Search .......................... 148/528; 228/155, 228/174, 183, 184, 208

(56) References Cited

U.S. PATENT DOCUMENTS

| 2,604,395 A | | 7/1952 | Gonser et al. |
| 3,605,254 A | * | 9/1971 | Armand et al. |
| 3,784,403 A | | 1/1974 | Glaski |
| 3,890,110 A | | 6/1975 | Glaski |
| 3,986,243 A | | 10/1976 | Schussler |
| 4,030,848 A | | 6/1977 | Keifert et al. |
| 4,030,849 A | | 6/1977 | Keifert et al. |
| 4,073,427 A | | 2/1978 | Keifert et al. |
| 4,098,452 A | * | 7/1978 | Webster et al. ............. 228/208 |
| 4,117,201 A | | 9/1978 | Keifert |
| 4,140,172 A | | 2/1979 | Corey |
| 4,291,104 A | | 9/1981 | Keifert |
| 4,818,629 A | | 4/1989 | Jenstrom et al. |
| 5,158,621 A | * | 10/1992 | Das et al. .................... 228/221 |
| 5,796,189 A | * | 8/1998 | Manning et al. .............. 310/54 |
| 6,527,160 B2 | * | 3/2003 | Hardwick .................... 228/107 |
| 2003/0010410 A1 | * | 1/2003 | Polvi et al. ................. 148/528 |

FOREIGN PATENT DOCUMENTS

| EP | 095284 | * 11/1983 |
| FR | 2414975 | 8/1979 |
| FR | 2690860 | 11/1993 |

OTHER PUBLICATIONS

Olivier Braun et al., "Valkuumloten, ein Fugeverfahren mit Vorteilen", Technische Rundschau, 1988, vol. 80, No. 42, pp. 42–43.

Bauer, "Looten und Harten von Bauteilen und Werkzeugen in Vakuumanlagen", Harterei–Technische Mitteilungen, 1981, vol. 36, No. 2, pp. 81–85.

Boughton et al., "Furnace brazing–2: a survey of modern processes and plant" Welding and Metal Fabrication, 1973, p. 137.

French Search Report, PCT/FR01/04016, Apr. 17, 2002, pp. 1–3.

* cited by examiner

Primary Examiner—George Wyszomierski
(74) Attorney, Agent, or Firm—Connolly Bove Lodge & Hutz LLP

(57) ABSTRACT

The aim of the present invention is a manufacturing process for assembly parts (101, 102, 111, 112) for the manufacture of elements of chemical devices (100), comprising the fixation of an anticorrosion metallic coating (31, 32) on an unprocessed assembly part (21, 22), by means of an operation comprising a brazing operation under a controlled atmosphere and, possibly, the shaping of the coated part (101, 102), by plastic deformation. The brazing temperature is preferentially less than approximately 750° C., and more preferentially between 600° C. and 720° C. The process according to the invention makes it possible to fix solidly on a steel plate an anticorrosion coating with a thickness less than 1 mm.

24 Claims, 5 Drawing Sheets a)

b)

c)

MANUFACTURING PROCESS FOR AN ELEMENT OF A CHEMICAL DEVICE COMPRISING A SUPPORT PART IN METAL AND AN ANTICORROSION METALLIC COATING

FIELD OF THE INVENTION

The present invention relates to devices for the handling, storage and processing of chemical products intended for the chemical industries. In particular, it concerns mixers, processing devices and routing devices capable of handling highly corrosive products, such as concentrated acids or bases. In the present application, the expression "elements of chemical devices" means in particular, and in a collective manner, storage chambers, tanks, heat exchangers, reaction vessels, mixers, processing devices and routing devices.

More specifically, the invention relates to a manufacturing process for plated products, such as elements of chemical devices or assembly parts intended for the manufacture of elements of chemical devices, comprising at least one support part in metal and an anticorrosion metallic coating.

STATE OF THE ART

The chemical industries use numerous elements of chemical devices, which are needed for handling, storing and/or processing highly corrosive chemical products and which, consequently, have to be capable of resisting any corrosion from the latter.

In order to guarantee high resistance to corrosion, the elements of the chemical device usually comprise steel support parts and a metallic anticorrosion coating with a base of so-called "noble" metals, such as titanium, tantalum, zirconium, a nickel-based alloy or stainless steel. The elements of the chemical device can be manufactured by assembling assembly parts, such as plates, previously coated with an anticorrosion metallic coating. The anticorrosion coating can be fixed to the support part in different ways, such as knurling, explosion cladding, hot rolling or simple covering without any join between the plate and the anticorrosion coating.

Certain applications, such as devices with low internal pressure, need a strong bond between the metal support part and the anticorrosion coating, that is to say a bond with high resistance to stripping, in order to avoid separation which could, for example, lead to collapsing of the anticorrosion coating. Knurling, explosion cladding and hot rolling make it possible to obtain very strong support/coating bonds, but these techniques cannot be used when the thickness of the anticorrosion coating is less than 0.7 mm.

Brazing makes it possible to obtain very strong support/coating bonds and reduce the thickness of the coating. However, brazing introduces additional difficulties. In particular, the difference in heat expansion coefficient between the substrate and the coating material (e.g. the expansion coefficient of steel is approximately twice as high as that of tantalum) results in the formation of mechanical stress. This stress weakens and deforms the coating. In addition, the brazing operation may induce the formation of intermetallic compounds liable to weaken the bond between the support and the coating. These difficulties are exacerbated by any shaping operations of the coated support part, particularly by means of plastic deformation.

The U.S. Pat. No. 4,291,104 held by Fansteel discloses the use of coatings comprising prior deformations referred to as "convolutions" in order to solve the random deformation problems induced by the differential expansions between the support and the coating. This solution does not prevent the formation of intermetallic compounds and reduces the area of the interface between the coating and the support, resulting in a weakening of the support/coating bond. In addition, this solution introduces serious problems for the subsequent shaping of the coated part. In particular, it is difficult to envisage rolling, between rollers, of large coated parts when the coating contains deformations. These deformations are also generally weakened by the crushing experienced during the shaping operations.

The applicant therefore looked for a method applicable to industrial development for fixing solidly a low thickness anticorrosion coating on a support part in metal, which enables subsequent deformation of the coated part and can be applied to large parts (typically plates wherein the surface is greater than approximately 1 m$^2$).

DESCRIPTION OF THE INVENTION

The aim of the invention is a process for manufacturing a plated product comprising a support part in metal (preferentially steel) and an anticorrosion metallic coating, wherein the anticorrosion coating is fixed (fastened) on the support part by brazing under controlled atmosphere, in such a way as to obtain a mechanical link between at least one defined part of the support part and at least one defined part of the coating.

The applicant noted that the process according to the invention made it possible to fix solidly on a metallic part, particularly in steel, an anticorrosion coating with a thickness less than 1 mm, or even less than 0.5 mm, possibly less than or equal to 0.3 mm.

According to a first aspect of the invention, the plated product is an assembly part intended to manufacture an element of a chemical device. In this aspect of the invention, the manufacturing process comprises:

fixation by brazing, under a controlled atmosphere, of an anticorrosion coating on a support part (or "unprocessed assembly part");

possible shaping of the coated part, by plastic deformation, in such a way as to produce a coated assembly part (or "shape part").

According to a second aspect of the invention, the plated product is an element of a chemical device. In this aspect of the invention, the manufacturing process comprises:

fixation by brazing, under a controlled atmosphere, of an anticorrosion coating on at least one first and one second unprocessed assembly parts;

shaping of said coated parts by plastic deformation;

assembly of said parts (typically with operations including welding) in such a way as to form said element of the chemical device.

The invention is particularly advantageous when the assembly parts are shaped after having been coated with the anticorrosion coating, i.e. after fixation of an anticorrosion coating on the support parts (or "unprocessed assembly parts"). This alternative embodiment of the invention particularly makes it possible to simplify the handling, transport, storage and processing of coated parts. According to this advantageous embodiment of the invention, the surface of the unprocessed assembly parts intended to be coated is typically essentially plane. Said parts may comprise parts which have been previously shaped by machining, drilling, boring, plastic deformation or any other means.

In a preferred embodiment of the invention, the fixation of the anticorrosion coating is carried out by brazing at a temperature less than approximately 750° C., and preferentially between 600° C. and 720° C., under a controlled atmosphere, which preferentially contains an inert gas in such a way as to prevent the oxidation of the coating during brazing. The applicant noted that using sufficiently low brazing temperatures made it possible to limit considerably the deformation of the coatings induced by the brazing operation and caused by differential expansion between the unprocessed part and the coating. It is then not necessary to pre-deform the coating to compensate for the differential expansion effect.

DETAILED DESCRIPTION OF THE INVENTION

Figure 1:
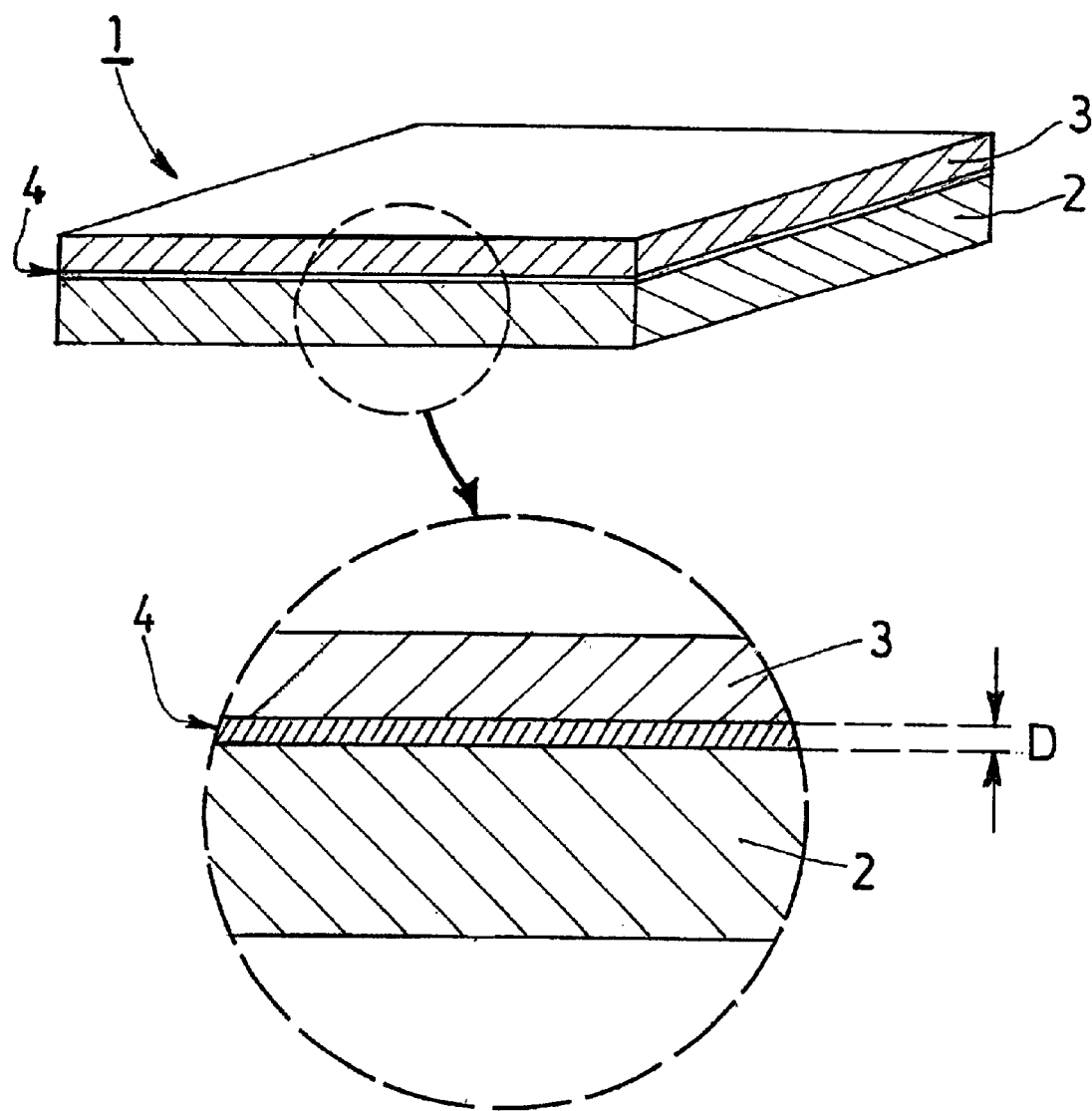
FIG. 1 illustrates schematically a portion of product plated according to the invention.
Figure 2:
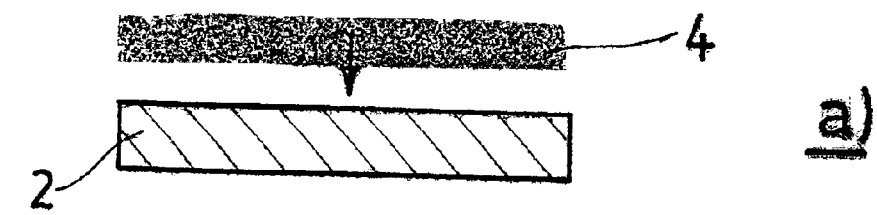
FIG. 2 illustrates schematically an embodiment of the process according to the invention.
Figure 2:
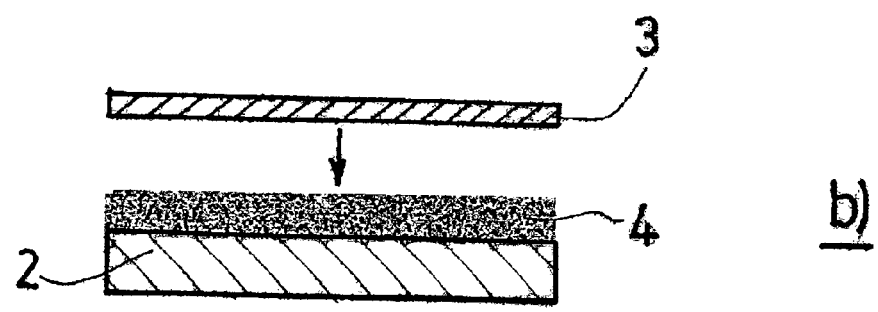
Figure 2:
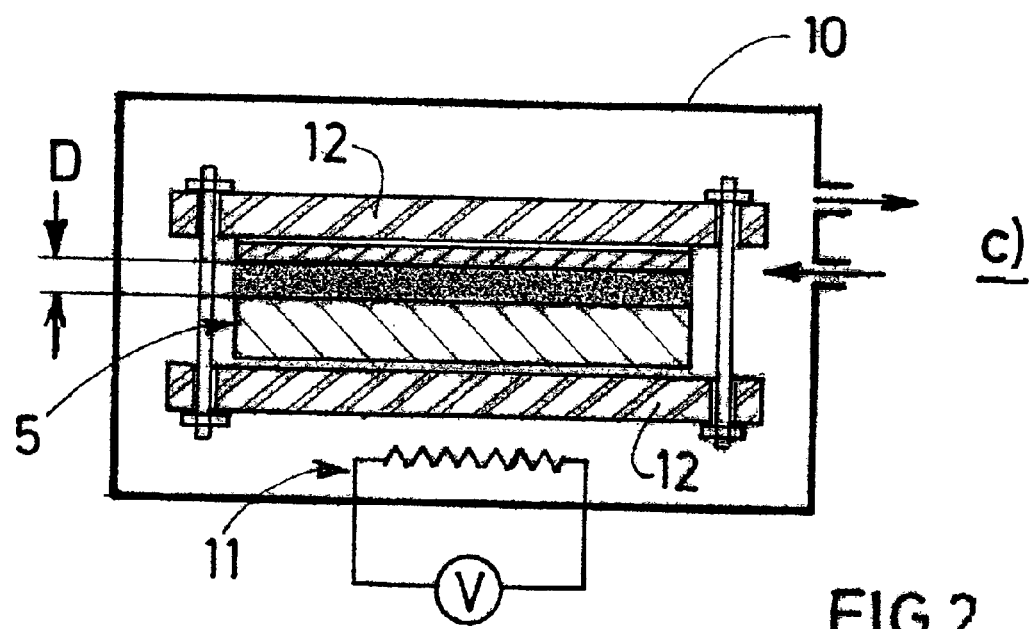
Figure 3:
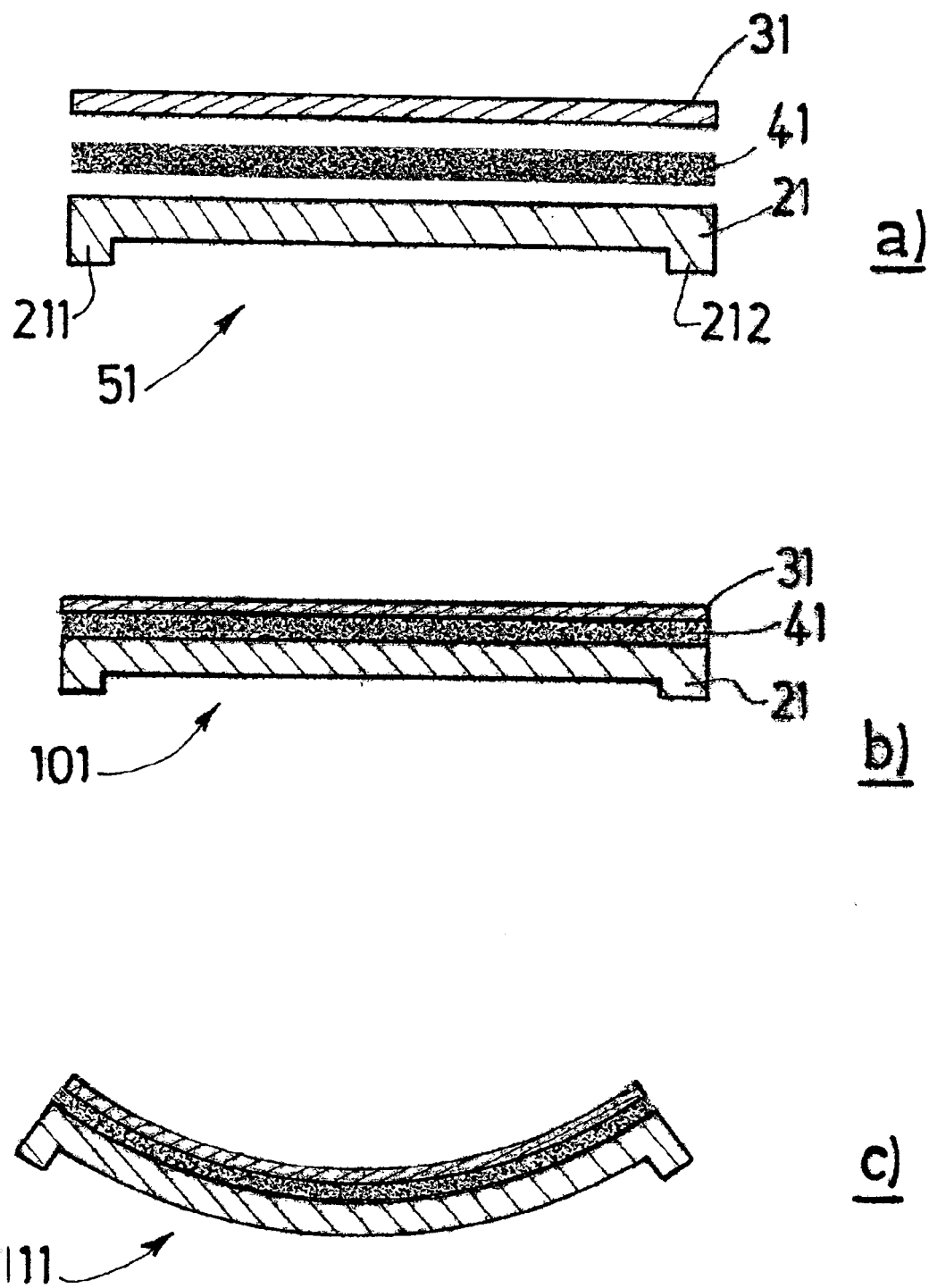
FIG. 3 illustrates schematically the manufacturing process of an assembly part, in a sectional view, according to an embodiment of the invention.
Figure 4:
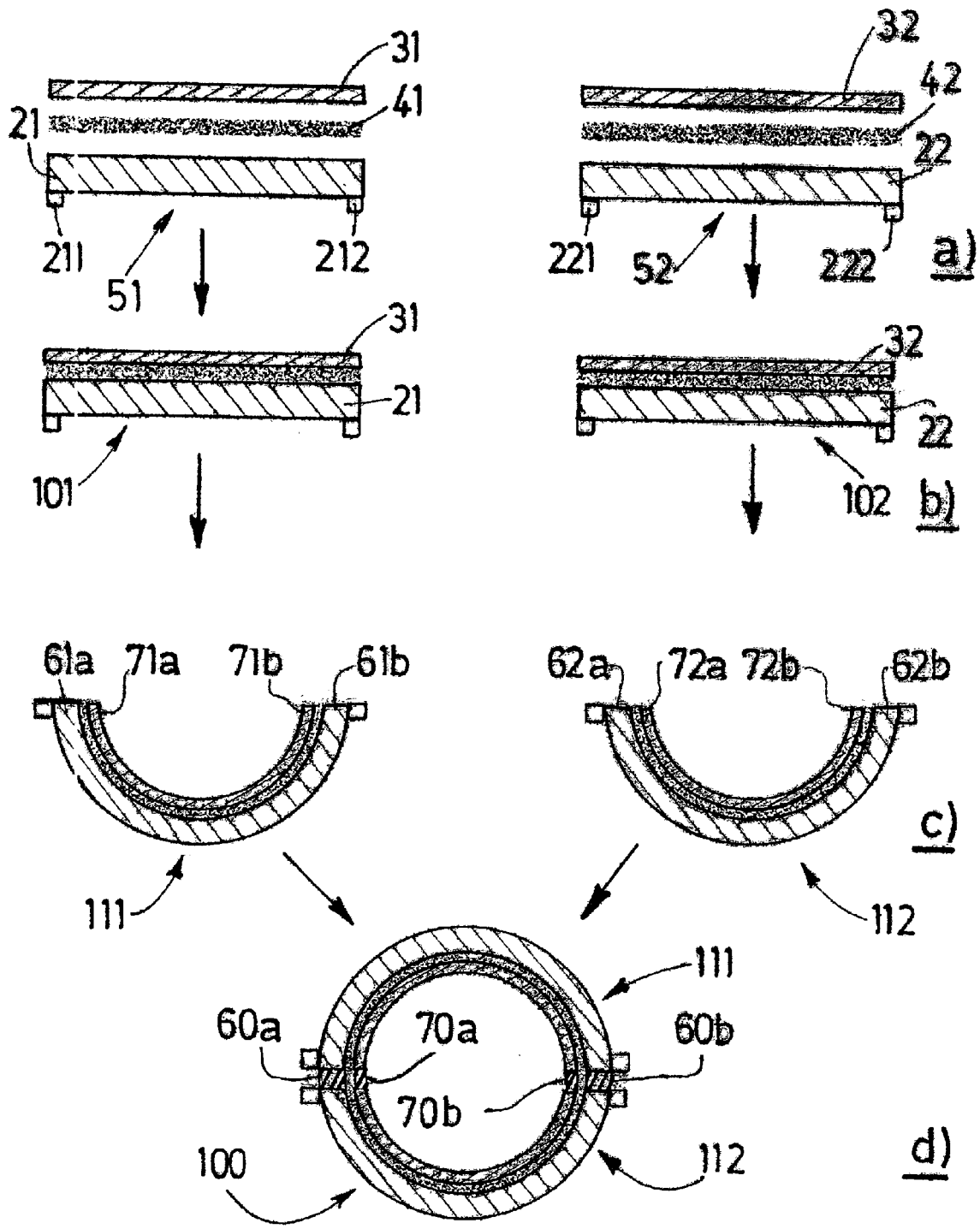
FIG. 4 illustrates schematically the manufacturing process of an element of a chemical device, in a sectional view, according to an embodiment of the invention.

According to the invention, the manufacturing process of an assembly part (111, 112) intended to manufacture an element of a chemical device (100), said part comprising a metal support part (2, 21, 22) and at least one anticorrosion metallic coating (3, 31, 32), comprises:

fixation of an anticorrosion coating (3, 31, 32) on a support part (2, 21, 22), by means of an operation comprising a brazing operation under a controlled atmosphere;

possible shaping of the coated part (101, 102), by plastic deformation, in such a way as to produce a coated assembly part (or "shape part") (111, 112).

According to a preferred embodiment of the invention, the manufacturing process of an element of a chemical device (100) comprises:

the production of at least one first (101) and one second (102) intermediate coated assembly parts according to the process according to the invention;

shaping of the intermediate coated parts (101, 102) by plastic deformation, in such a way as to produce coated assembly parts (111, 112) having a defined shape;

the production of an element of a chemical device (100) by assembling coated assembly parts (111, 112).

More specifically, in this embodiment, the manufacturing process of an element of a chemical device (100) comprising at least one first and one second coated assembly parts (111, 112), each said coated assembly part comprising a metal support part (21, 22) and at least one anticorrosion metallic coating (31, 32), comprises:

the supply of at least one first (21) and one second (22) support parts;

the fixation of each anticorrosion coating (31, 32) on each of said support parts (21, 22), by means of a process comprising a brazing operation under a controlled atmosphere and using at least one brazing material (41, 42), in such a way as to produce intermediate coated parts (101, 102);

shaping of the intermediate coated parts (101, 102) by plastic deformation, in such a way as to produce coated assembly parts (111, 112) having a defined shape;

the assembly of the coated assembly parts (111, 112), typically by means of operations including welding, in such a way as to obtain said element of a chemical device (100).

The controlled atmosphere in said chamber (10) is preferentially essentially composed of inert gas. The inert gas atmosphere is preferentially at a defined pressure P. This atmosphere is typically formed by evacuating the initial atmosphere from the chamber (typically down to a residual pressure between approximately 0.1 and 1 Pa) and introducing said inert gas until a defined pressure P is reached. This purging operation may be repeated more than once. The inert gas may be a rare gas (typically argon or helium) or nitrogen, or a mixture thereof. The inert gas pressure in the chamber (10) is typically between approximately $10^2$ and $10^5$ Pa (i.e. between 1 mbar and 1 bar). A low pressure P makes it possible to limit the unfavourable impact of the reactive substances (such as water or oxygen) possibly present in industrial inert gases.

The shaping of the coated parts (101, 102) by plastic deformation is typically carried out by rolling or calendering.

In a preferred embodiment of the invention, said brazing operation typically comprises:

interposing at least one brazing material (4, 41, 42) between a metal support part (2, 21, 22) and an anticorrosion coating (3, 31, 32), in such a way as to form an initial assembly (5, 51, 52);

possibly, applying a plating pressure on said initial assembly (5, 51, 52);

introducing the initial assembly (5, 51, 52) into a controlled-atmosphere chamber (10) equipped with at least one heating means (11), such as a resistor;

forming an inert gas atmosphere in said chamber (10) (and more particularly in the vicinity of said assembly);

heating said assembly (5, 51, 52) up to a temperature at least equal to the brazing temperature of said brazing material (4, 41, 42).

Interposing the brazing material (4, 41, 42) between the support part (2, 21, 22) and the anticorrosion coating (3, 31, 32) can be carried out in two stages. In particular, the interposing can comprise:

depositing the brazing material (4, 41, 42) on the support part (2, 21, 22), at the location of the so-called "bonding" surface;

positioning the anticorrosion coating (3, 31, 32) on the support part (2, 21, 22), in such a way as to form said initial assembly (5, 51, 52).

In this preferred embodiment of the invention, the manufacturing process of an element of a chemical device (100) is wherein it comprises:

manufacturing intermediate coated assembly parts (101, 102) according to a process comprising a brazing operation comprising:

forming an initial assembly (51, 52) comprising a support part (21, 22), an anticorrosion coating (31, 32) and at least one brazing material (41, 42) between the support part and the coating;

introducing the initial assembly (51, 52) into a controlled-atmosphere brazing chamber (10);

forming a controlled atmosphere in said chamber (10);

heating said assembly (51, 52) up to a temperature at least equal to the brazing temperature of said brazing material (41, 42), in such a way as to fix the anticorrosion coating (31, 32) on the support part (21, 22) by brazing;

shaping of said intermediate coated parts (101, 102), by plastic deformation, in such a way as to obtain said coated assembly parts (111, 112);

assembling the coated assembly parts (or "shape parts") (111, 112), in such a way as to obtain said element of a chemical device (100).

In certain cases, it can be advantageous to first carry out the deposit of the brazing material (4, 41, 42) on the anticorrosion coating (3, 31, 32), at the location of the so-called "bonding" surface, and then to position the support part (2, 21, 22) on the anticorrosion coating, in such a way as to form said initial assembly (5, 51, 52).

The brazing temperature, typically equal to the fusion temperature of the brazing material, is such that the material melts and produces an intimate bond with the element in contact with it (metal support part and/or anticorrosion coating). The brazing temperature is preferentially less than approximately 750° C., and more preferentially between 600° C. and 720° C. These temperatures make it possible to shorten the length of the brazing operation.

The brazing operation normally comprises bringing said defined parts together in such a way as to obtain a spacing D which is preferentially chosen so as to avoid the formation of gas bubbles or bonding defects between the bonding surfaces during the brazing operation. The spacing D is typically less than 0.1 mm.

The process advantageously comprises the application of a plating pressure on said initial assembly (5, 51, 52) during all or part of the brazing operation. More specifically, it is advantageous to apply a mechanical plating pressure on said assembly before and/or during said heating. This plating pressure is applied in such a way as to tighten the support part and the anticorrosion coating against each other and in such a way as to compress the brazing material, which particularly makes it possible to obtain the desired value for the spacing D between the support part and the coating. The plating pressure can be applied by a mechanical tightening system (12), such as a spring tie rod system and tightening plates or a pneumatic system (such as an inflatable cushion). The low temperature brazing operation according to a preferred embodiment of the invention limits the deterioration of the mechanical tightening system (12). The plating pressure is typically greater than 0.1 MPa, preferentially greater than 0.3 MPa, and more preferentially greater than 0.5 MPa.

Said defined parts are called bonding surfaces. The link between the support part and the coating can be established by several bonding surfaces.

The surface (and more specifically the bonding surface(s)) of the support parts (21, 22) and/or the coatings (31, 32) are advantageously pre-treated, before the brazing operation, in such a way, in particular, as to eliminate the surface oxides. For example, it is possible to carry out at least one treatment selected from chemical, electrochemical, physicochemical and mechanical treatments (such as chemical pickling, electrochemical pickling, machining or sanding). These treatments may be combined. In the case of support parts, the treatment relates to at least the surface intended to be coated.

In order to enhance the strength of the bonding, the process according to the invention may also comprise depositing at least one layer capable of improving the adherence of the brazing material and limiting the formation of weakening compounds. The deposition can be performed by chemical means, electrolytic means or in vapour phase (chemical vapour deposition or physical vapour deposition). Said layer is typically metallic, for example titanium or copper. The deposition may be carried out on the support part (2, 21, 22), the metallic coating (3, 31, 32) or both. The deposition is performed before the brazing operation.

The brazing material is preferably spread uniformly between the support part and the anticorrosion coating in order to obtain a uniform bonding layer and to increase the contact surface between these two elements.

The support part (2, 21, 22) is preferentially made of steel. The steel used is generally a carbon steel or a stainless steel.

The anticorrosion metallic coating (3, 31, 32) is typically made of titanium, a titanium alloy, tantalum, a tantalum alloy, zirconium, a zirconium alloy, nickel-based alloy or stainless steel.

The brazing material (4, 41, 42) can be a fusible alloy (typically an eutectic alloy) or a fusible metal. Said material (4, 41, 42) can possibly contain a flux. Advantageously, the brazing material can diffuse in the element with which it is in contact, which makes it possible to ensure a very strong bond between said elements. The brazing material is typically in the form of a powder, a sheet or a mesh. In its trials, the applicant noted that the mesh presented the advantage of compensating efficiently for any possible variation in the spacing D between the bonding surfaces.

The brazing material (4, 41, 42) is typically a material containing silver, copper, zinc, cadmium or tin, or a mixture thereof, wherein the brazing temperature is less than approximately 750° C., and preferentially between 600° C. and 720° C.

The support part (2, 21, 22) and the anticorrosion coating (3, 31, 32) typically take the form of plates or sheets. These elements can be cut out beforehand, particularly to form openings and access routes.

The support parts or unprocessed assembly parts (21, 22) can also comprise integrated assembly means, such as protuberances (211, 212, 221, 222).

The coated shape parts (111, 112) are typically rounded, half-cylindrical or another shape.

Figure 5:
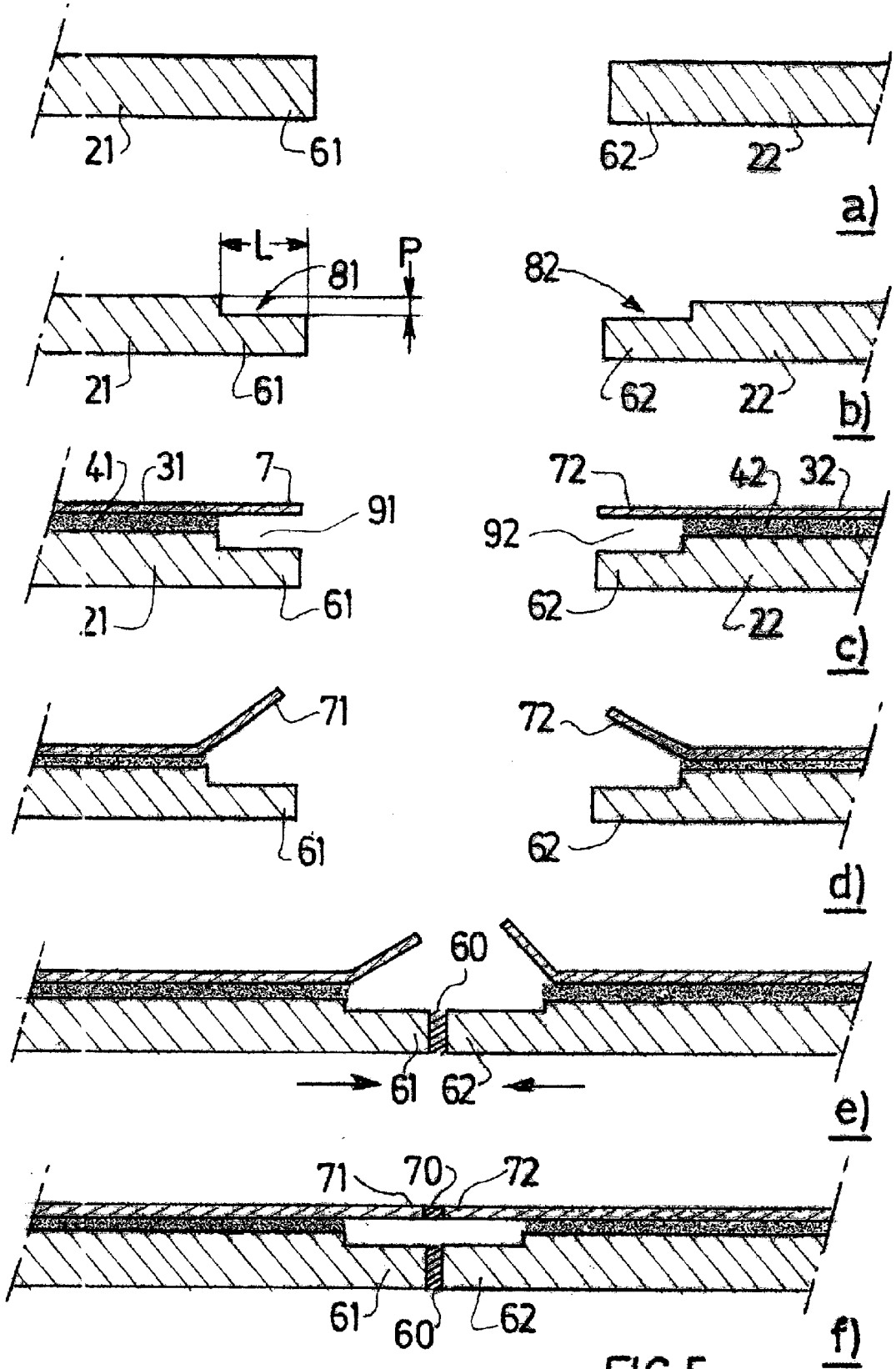
FIG. 5 illustrates schematically the manufacturing process of an element of a chemical device, in a sectional view, according to an alternative embodiment of the invention.

The assembly operation of the coated assembly parts (111, 112), in such a way as to produce an element of a chemical device (100), comprises the formation of joins (60, 60a, 60b, 70, 70a, 70b) between said parts, typically by means of welding operations using any known means. The joins between the support parts (21, 22) are normally produced separately from the joins between the coating parts (31, 32). To produce these joins, the applicant developed a particularly advantageous alternative embodiment of the process according to the invention wherein the ends (61, 61a, 61b, 62, 62a, 62b) of the metal parts (21, 22) are previously undercut, typically by means of machining, before the fixation of the coating, as illustrated in FIG. 5. This alternative embodiment facilitates the formation of the joins between the assembly parts. It particularly makes it possible to do away with, after brazing, the machining of the support part which would otherwise be necessary to produce the joins between support parts.

According to a preferred embodiment of this advantageous alternative embodiment of the invention, the manufacturing process of an element of a chemical device comprises:

the formation of recesses (81, 82) at the ends (61, 62) of said support parts (21, 22) intended to be joined before the brazing operation, in such a way as to avoid brazing between each coating (31, 32) and each support part (21, 22) at the location of said recesses;

clearing of the ends (71, 72) of each coating (31, 32), typically by raising said ends (71, 72), after the brazing operation;

the formation of a join (60) between the ends (61, 62) of said support parts (21, 22), typically by welding;

the formation of a join (70) between the ends (71, 72) of said coatings (31, 32), typically by welding.

The fixation of the coatings on the support parts is performed using the processes described above.

The purpose of the recesses (81, 82) is to avoid brazing between the support parts (21, 22) and the coatings (31, 32) at the location where they are formed, hereafter referred to as the separation zone (91, 92). To this end, the depth P of said recesses (81, 82) can be relatively low, i.e. typically between 1 and 5 mm, preventing the mechanical characteristics of the support part (21, 22) from being reduced. The width L of said recesses (81, 82) is fixed in such a way as to enable easy clearance of the bonding zone between the support parts. The length L is typically between 10 and 50 mm. The recess (81, 82) typically takes the form of a plane area parallel to the plane of the ends (61, 62) of the support parts (21, 22).

More specifically, the manufacturing process of an element of a chemical device (100) according to this advantageous alternative embodiment of the invention comprises:

the supply of at least one first (21) and one second (22) support parts;

the formation of recesses (81, 82) at the ends (61, 62) of said support parts (21, 22) intended to be joined;

the fixation of the anticorrosion coating (31, 32) on each support part (21, 22), by means of brazing under a controlled atmosphere (preferentially at a temperature less than 750° C., and more preferentially between 600 and 720° C.), producing intermediate coated parts (101, 102);

shaping (typically by rolling or calendering) of the intermediate coated parts (101, 102), producing coated assembly parts (111, 112);

the clearance of the ends (71, 72) of each coating (31, 32), typically by raising said ends (71, 72);

the formation of joins (60) between the ends (61, 62) of said support parts (21, 22), typically by means of welding operations;

the formation of joins (70) between the ends (71, 72) of said coatings (31, 32), typically by means of welding operations.

Said element of the chemical device (100) is typically comprised in the group comprising storage chambers, tanks, heat exchangers, reaction vessels, mixers, processing devices and routing devices.

EXAMPLE

Trials on manufacturing assembly parts coated according to the process according to the invention were carried out using plates in carbon steel and anti-corrosion coating in tantalum. The brazing material was a silver-based alloy containing copper, zinc, and tin. A mechanical pressure was applied continuously during the brazing operation. The brazing temperature was less than 700° C.

The join between the steel plate and tantalum sheet showed very few defects after brazing and hardness which did not exceed 150 Hv. Shaping tests, with a low radius of curvature, showed the absence of ruptures in the join.

Advantages of the Invention

The plated products obtained with the process according to the invention offer the advantage of high transversal thermal conductivity thanks to close bonding between the support part and the anticorrosion coating over the greater part of the bonding surface, which is not the case, for example, with a bond obtained by knurling which only produces bonding bands. Transversal thermal conductivity is particularly advantageous in chemical devices comprising heat transfer means such as an exchanger or a double envelope for cooling or heating.

The plated products according to the invention also show a good shapeability and, as a result, make it possible to manufacture elements of chemical devices easily.

The manufacturing process makes it possible to do away with the machining step of the support part during subsequent welding operations to manufacture elements of chemical devices.

List of Numerical References

1 Plated product
100 Element of chemical device
101, 102 Intermediate coated assembly part
111, 112 Coated assembly part
2 Metal support part
21, 22 Support part or unprocessed assembly part
211, 212, 221, 222 Integrated assembly means
3, 31, 32 Coating
4, 41, 42 Brazing material
5, 51, 52 Initial assembly
60 Join between support plates
61, 61a, 61b, 62, 62a, 62b End of assembly part
70 Join between coatings
71, 71a, 71b, 72, 72a, 72b End of coating
81, 82 Recesses
91, 92 Separation zone
10 Controlled atmosphere chamber
11 Heating means
12 Tightening system

What is claimed is:

1. A process for manufacturing a chemical device element comprising at least one first assembly part and at leant one second coated assembly part, each said coated assembly part comprising a metal support part and at least one anticorrosion metallic coating, said process comprising the following successive steps:

A manufacturing two or more intermediate coated assembly parts by a brazing operation comprising: (i) forming an initial assembly comprising a support part, an anti-corrosion coating and at least one brazing material between the support part and the coating; (ii) introducing the initial assembly into a controlled-atmosphere brazing chamber, (iii) forming a controlled atmosphere in said chamber; (iv) heating said assembly up to a temperature at least equal to the brazing temperature of said brazing temperature of said brazing material, in such a way as to fix the anticorrosion coating on the support part by brazing;

B shaping said intermediate coated parts, by plastic deformation, in such a way as to obtain said first and second coated assembly parts;

C assembling the coated assembly parts, in such a way as to obtain said chemical device element.

2. Manufacturing process according to claim 1, wherein the brazing temperature is less than approximately 750° C.

3. Manufacturing process according to claim 2, wherein the brazing temperature is between 60° C. and 720° C.

4. Manufacturing process according to any of claim 1, wherein the controlled atmosphere comprises essentially inert gas.

5. Manufacturing process according to claim 4, wherein the inert gas is at least one selected from the group consisting of rare gas and nitrogen.

6. Manufacturing according to claim 1, wherein the controlled atmosphere of the chamber is a pressure P between approximately $10^2$ and $10^5$ Pa during brazing.

7. Manufacturing process according to claim 1, wherein said process further comprises the application of a plating pressure on said initial assembly during all or part of the brazing operation.

8. Manufacturing process according to claim 7, wherein the plating pressure is greater than 0.1 Mpa.

9. Manufacturing process according to claim 1, wherein said process further comprises at least one pre-treatment of the surface of said support parts intended to be coated and in that the treatment is selected from the group consisting of chemical, electrochemical, physiochemical and mechanical treatments and combinations thereof.

10. Manufacturing process according to claim 1, wherein said process further comprises depositing at least one layer capable of improving the adherence of the brazing material and limiting the formation of weakening compounds.

11. Manufacturing process according to claim 10, wherein said layer is metallic.

12. Manufacturing process according to claim 10, wherein the deposition is performed by chemical means, electrolyte means or in vapour phase.

13. Manufacturing process according to claim 1, wherein the thickness of said coating is less than 1 mm.

14. Manufacturing process according to claim 1, wherein the thickness of said coating is less than 0.5 mm.

15. Manufacturing process according to claim 1, wherein said coating is made of a metal selected from the group consisting of tantalum, tantalum alloys, titanium, titanium alloys, zirconium, zirconium alloys, nickel-based alloys and stainless steels.

16. Manufacturing process according to claim 1, wherein the brazing material contains silver, copper, zinc, cadmium or tin, or a mixture thereof.

17. Manufacturing process according to claim 1, wherein the brazing material is in the form of a powder, a sheet or a mesh.

18. Manufacturing process according to claim 1, wherein said support part is made of steel.

19. Manufacturing process according to claim 18, wherein said steel is a carbon steel or a stainless steel.

20. Manufacturing process according to claim 1, wherein said support part takes the form of plates or sheets.

21. Manufacturing process according to claim 1, wherein said coating takes the form of plates or sheets.

22. Manufacturing process according to claim 1, wherein said process further comprises:
   a. Forming recesses at the ends of each support part intended to be joined before the brazing operation, in such a way as to avoid brazing between each coating and each support part at the location of said recesses;
   b. Clearing of the ends of each coating after the brazing operation;
   c. Forming a joint between the ends of said support parts;
   d. Forming a joint between the ends of said coatings.

23. Manufacturing process according to claim 22, wherein the joints between the ends of said support parts and the joints between the ends of said coatings are produced by welding.

24. Manufacturing process according to claim 1, wherein said chemical device element is selected from the group consisting of storage chambers, tanks, heat exchangers, reaction vessels, mixers, processing devices and routing devices.

* * * * *